United States Patent [19]

Miller

[11] 4,107,373
[45] Aug. 15, 1978

[54] FLAME RETARDANT CELLULOSIC MATERIALS

[75] Inventor: George T. Miller, Lewiston, N.Y.

[73] Assignee: Hooker Chemicals & Plastics Corporation, Niagara Falls, N.Y.

[21] Appl. No.: 645,156

[22] Filed: Dec. 30, 1975

[51] Int. Cl.² .................. C09D 5/18; B32B 33/00
[52] U.S. Cl. .................................. 428/264; 428/272; 428/290; 428/393; 428/537; 428/541; 428/543; 428/921; 252/8.1; 252/8.6; 260/513.6; 260/456 A; 260/458 R; 427/390 D; 106/15 FR
[58] Field of Search ............... 428/272, 224, 274, 264, 428/393, 290, 411, 537, 541, 543, 921; 427/390 D; 252/8.1; 106/15 FP; 260/513.6, 456 A, 458

[56] References Cited

U.S. PATENT DOCUMENTS

| 2,142,115 | 1/1939 | Cupery | 428/921 X |
|---|---|---|---|
| 2,422,730 | 6/1947 | Hoffman | 106/15 FP |
| 2,757,102 | 7/1956 | Wooding et al. | 106/15 FPX |
| 2,935,471 | 5/1960 | Aarons et al. | 106/15 FP X |
| 3,896,250 | 7/1975 | Miller | 428/921 X |

Primary Examiner—P. C. Ives
Attorney, Agent, or Firm—Peter F. Casella; William J. Crossetta, Jr.; Arthur S. Cookfair

[57] ABSTRACT

Cellulosic materials such as paper, wood, cotton, rayon and the like are rendered flame retardant by the intimate association therewith of an effective flame retardant amount of a reaction product of aqueous solution of sulfamic acid and an alkylene oxide e.g., ethylene oxide. Amounts of said reaction product of at least, and preferably in excess of, 0.5 percent by weight are generally effective to render the cellulosic material flame retardant. Preferably the reaction product is rendered neutral before or after application to the cellulosic material in order that the material be rendered noncorrosive and nonirritating in nature.

16 Claims, No Drawings

FLAME RETARDANT CELLULOSIC MATERIALS

FIELD OF INVENTION

The invention relates to improvements in the art of rendering cellulosic materials flame retardant. More particularly it relates to the treatment of cellulosic materials such as paper, wood, cotton, rayon and the like, with effective fire retardant amounts of a reaction product of sulfamic acid and ethylene oxide.

BACKGROUND OF THE INVENTION

Cellulosic materials such as paper, wood, and cotton textiles, are highly flammable substances and once ignited continue to burn. Methods for the flame proofing of these materials are known but such methods are either too costly for general commercial use, relatively ineffective, or give rise to products having poor surface character.

With particular reference to paper, methods involving the application of salts of phosphoric acid, boric acid and sulfamic acid are, or have been, used. These methods while commercially attractive, costwise, are troublesome due to the crystallization of such salts on the treated material after drying. Further, the salts crystallize on the application equipment necessitating the frequent shut down of such equipment for cleaning.

Organo phosphorus compounds, such as tetrakis (alpha hydroxyethyl) phosphonium chloride and various derivatives thereof, have also been suggested for the flame proofing of cellulosic materials. Such compounds provide a level of flame retardancy which is at least equivalent to that obtained with the aforementioned phosphate and borate salts. Moreover, the organo phosphorus compounds provide a durable flame retardant character which withstands repeated laundering and dry cleaning. Such compounds, however, because of their relatively high cost, are economically feasible salts only where the durable finish is required.

Accordingly it can be seen that a need exists for a low cost effective method for rendering cellulosic materials fire retardant which methods do not deleteriously affect the surface characteristics of the treated material.

SUMMARY OF THE INVENTION

In accordance with the present invention, cellulosic materials are rendered fire retardant by intimately admixing the material with an effective fire retardant amount of a reaction product of sulfamic acid and an alkylene oxide. The resultant product may be rendered neutral in character and thereafter dried to yield a product which not only is surprisingly fire retardant, non-corrosive and non-irritating in character but also has a pleasant surface character, i.e. "hand".

By "effective flame retardant amount" is that amount of said reaction product which suffices to impart flame retardant character to the cellulosic material as defined by the American Society of Testing Materials Test Standard D-777-46 and/or TAPPI Standard Test T-461.

The term "Oxygen Index" as used herein below is that value determined in accordance with the testing procedure described in "The Oxygen Flame Flammability Test" J. L. Isaacs, J. Fire and Flammability Vol. 1 (Jan. 1970, page 36 et seq.).

The materials treated in accordance with the present invention may be formed in part or in whole of cellulosic materials such as paper, wood, cotton and rayon and may be in various forms such as wood pulp, textile fibers or sheet goods. The materials can also be in comminuted form e.g., paper pulp, cotton fibers, etc. nonwoven form, e.g. paper sheets, wood boards, woven form, e.g., cotton or rayon textile sheeting, and the like. Accordingly although, hereinafter, primary reference will be made to the treatment of sheets of paper, this is not to be taken as a limitation as other forms of cellulosic material may be utilized as the materials treated in accordance with the present invention.

DETAILED DESCRIPTION OF THE INVENTION

In accordance with a preferred mode of carrying out the present invention cellulosic materials, as above defined, are intimately associated with an effective flame retardant amount of a reaction product of an aqueous solution of sulfamic acid and an alkylene oxide. Thereafter the treated material may be contacted with an alkaline material, e.g., ammonia, ammonium hydroxide, organic amines such as ethylamine, ethylene diamine and the like, to render the treated material substantially neutral, i.e., a pH of about 6 to 7.5. Alternatively the reaction product, prior to association with the cellulosic material, may be neutralized and thereafter utilized as a substantially neutral solution.

The fire retardant treatment of the invention can be accomplished by several means. For example, the cellulosic material, in finished or unfinished condition, can be immersed, padded, sprayed, dipped or otherwise admixed with the aqueous reaction product, the thoroughly wetted or intimately associated mixture dried to remove excess moisture and then exposed to gaseous ammonia vapors until the treated material reacts substantially neutral. The treated cellulosic material may be heated to below its decomposition temperature without significant effect on the treatment.

Alternatively the material can be intimately associated with an aqueous solution of the substantially neutral reaction product to thoroughly impregnate the cellulosic material. Thereafter the treated material containing an effective fire retardant amount of the neutralized reaction product can be dried in any convenient manner.

The reaction product used in the process of this invention is a complex mixture of unknown composition and is obtained by reacting an alkylene oxide e.g., ethylene oxide, 1,2-propylene oxide, 2,3-butylene oxide, and the like with sulfamic acid.

The preferred reactants are sulfamic acid and ethylene oxide because of their overall effectiveness and low cost.

Aqueous solutions of the sulfamic acid are used. Such solutions may contain from about 1 to about 40 percent by weight or saturation of 100 percent sulfamic acid. Preferably they contain from about 5 to about 40 percent by weight of 100 percent sulfamic acid. Even more preferred are solutions containing from about 7 to about 25 percent of sulfamic acid. A slurry of sulfamic acid and water containing up to about 90 percent by weight sulfamic acid may also be used.

To carry out the preferred preparation of the said reaction product, an aqueous solution of the sulfamic acid is placed in a suitable reactor which may be equipped with an agitator and the alkylene oxide is bubbled into the solution. The initial exotherm may be controlled by cooling the mixture and/or by adjusting the rate of addition of the alkylene oxide. The temperature of the reaction is adjusted to from about 0° to about 100° centigrade and preferably from about 10° to about 80° centigrade. An amount of the alkylene oxide which is from about ¼ to about 2½ times the weight of 100 percent sulfamic acid is added to the solution. Preferably, from about ½ to about 1½ times the weight of 100 percent sulfamic acid is used. The resultant solution can be used directly but preferably it is neutralized to a pH of about 6.0 to about 8, with ammonia or other alkaline reacting substances, as defined above.

The resulting aqueous solution of the reaction product is a rather complex mixture which does not crystallize on standing or on evaporation, or if crystals do form they are rather minimal in amount. Thus the reaction product is a liquid to a fluid slurry even after drying. The reaction product is substantially neutral or can be rendered neutral in situ or after application to the cellulosic material. Such a composition is eminently advantageous since it can be more effectively applied to and distributed throughout the material than a composition which crystallizes on drying and thus deposits isolated crystals on the material thereby affecting the surface character, e.g., hand, of the treated material.

The present invention can be most advantageously utilized for imparting flame retardant character to paper and paper products either at the pulp stage or finished stage in such products as crepe or tissue paper used for decorative purposes, toweling paper, cardboard, corrugated cardboard and the like. The aqueous reaction product can also be used to treat Christmas trees by dipping, spraying and the like, to make the trees fire retardant. Further as has been discovered by another, the aqueous solution is a highly effective flame retardant material which can be used to combat forest fires. In such applications, additives such as jaguar gums to regulate viscosity, wetting agents, iron oxides and other coloring agents, other flame retardant additives such as antimony oxides, can be dissolved or suspended in the aqueous solution. This then can be used to spray the burning area and/or limit the burning area by spraying the area adjacent thereto and thereby to prevent or to limit the fire. On evaporation of the water from the solution a viscous liquid remains which adheres to and coats the trees and effectively renders them flame retardant.

The following examples will illustrate the present invention. Parts and percentages are by weight and temperatures are given in degrees centigrade.

EXAMPLE 1

Distilled water was mixed with 100 percent sulfamic acid to make 500 grams of a 10% solution by weight of sulfamic acid. One hundred cc of this solution was set aside.

EXAMPLE 2

Forty grams of ethylene oxide were bubbled into 400 grams of the 10% aqueous solution of sulfamic acid of Example 1. The temperature rose to 73° C during the addition of the ethylene oxide to the dilute sulfamic acid solution.

EXAMPLE 3

Some of the solution prepared in Example 2 was neutralized with concentrated $NH_4OH$ to a pH of about 7.5.

EXAMPLE 4

Some of the solution of Example 1 was neutralized to a pH of about 7.5 with concentrated $NH_4OH$.

EXAMPLE 5

About 4 to 5 cc of each of the solutions prepared in Examples 1–4 were placed on individual chrome plated plates. The plates were placed in an oven for drying.

Afterwards, removal from the oven, the plate holding the solution of Example 1 contained crystals. The plate having the solution of Example 2 contained some small crystals in fluid liquid, the size and amount of which were judged to be insignificant. The plate holding the solution of Example 3 contained fluid alone. The plate holding the solution of Example 4 contained crystals.

The plate containing the fluid of Example 3 was further heated with hot air. No crystallization occured and the pH of the fluid remained in the range of about 7.

EXAMPLE 6

Three 2-inch wide strips of tissue paper ("Kim-Wipe") were immersed in the solutions of Examples 1, 2 and 3. Each impregnated strip of tissue paper was laid on a metal plate, covered with a piece of filter paper and a paper towel, and the "sandwich" was squeezed dry by rolling. The tissue paper was tested according to the TAPPI flame test.

The strip treated with the solution of Example 1 had a char length of 5¼ inches. The strip treated with the solution of Example 2 had a char length of 5¼ inches. The strip treated with the solution of Example 3 had a char length of 4 inches. The results for Example 3 appeared to be excellent as the hand of the treated tissue paper was excellent and its strength was practically unaffected by the treatment.

EXAMPLE 7

The tissue of Example 6 which was treated with the solution of Example 3 was placed in an oven along with a piece of commercial crepe. Both browned about the same and lost about the same strength, thus showing good heat stability of the sample tissue.

EXAMPLE 8

Some of the solution of Example 3 was placed on cast iron and heated. The cast iron was unaffected by this treatment. This shows that the solution is non-corrosive.

EXAMPLE 9

Fifty grams of sulfamic acid were mixed with water to form a solution of 500 grams which was 10 percent by weight sulfamic acid.

(A) 15 Grams of ethylene oxide was added to 100 of the 10 percent sulfamic acid solution by bubbling the ethylene oxide gas into the solution. The resultant ethylene oxide/sulfamic acid solution was neutralized with 1.9 grams of $NH_3$.

(B) 8.7 Grams of ethylene oxide was added to 100 grams of the 10% sulfamic acid solution in the same manner as in A. The resulting ethylene oxide/sulfamic acid solution was neutralized with 2.0 grams of $NH_3$.

(C) 4.6 Grams of ethylene oxide were added to 100 grams of the 10% sulfamic acid solution in the same manner as in A. The resulting ethylene oxide/sulfamic acid solution was neutralized with 2.0 grams of $NH_3$.

(D) 100 Grams of the 10% sulfamic acid were neutralized with 2.2 grams of $NH_3$. Strips of paper toweling were treated with one of the above solutions of A, B, C or D. The strips of paper were treated by either the steps of:

(1) wetting the paper with a solution of A, B, C, or D, blotting the wetted paper between dry towels and pressing the dry towels with a heavy roller to maximize the removal or excess solution from the treated strip; or (2) wetting the paper with a solution of A, B, C or D, blotting the wetted paper with dry towels and pressing with hand pressure only. This method squeezes out less excess solution than step 1 and thus should result in greater solution add-on.

In the following table of results, under the heading "sample", the letter denotes the solution with which the sample paper towel (of A, B, C or D above) was treated, and the numerical subscript denotes the method (either steps 1 or steps 2 above) by which the solution was added to the paper. "EO/Acid ratio" means the ratio of ethylene oxide to 100% sulfamic acid added to the sample. "Total % wet add-on" is the percent by weight of the solution added to the sample per the dry weight of the sample. "Total dry add-on" is the percent by weight of the dry add-on per the dry weight of the sample. "Computed add-on of sulfamic acid" is the percent by weight of sulfamic acid added to the sample per the dry weight of the sample as computed from the other values. "Burn test inches of char" is the length of the burn of the treated sample after the treated sample was subjected to the TAPPI test T-461.

From the results below it is concluded that the ethylene oxide increases the efficiency of the sulfamic acid as a fire retardant.

RESULTS

| Sample | E/O Acid Ratio | Total Percent Wet Add-On | Total Dry Add-On | Computed Add-On of Sulfamic Acid | Burn Test Inches of Char |
|---|---|---|---|---|---|
| $A_1$ | 1.5/1 | 126% | 16% | 6.4% | 3¾ |
| $A_2$ | " | 168% | 21% | 8.4% | 2½ |
| $B_1$ | .87/1 | 136% | 17.3% | 9.3% | 3½ |
| $B_2$ | " | 174% | 21.4% | 11.4% | 2¾ |
| $C_1$ | .46/1 | 126% | 16.3% | 11.2% | 3½ |
| $C_2$ | " | 165% | 21.0% | 14.4% | 2½ |
| $D_1$ | 0/1 | 128% | 15.1% | 15.1% | 3 |
| $D_2$ | " | 169% | 20.0% | 20.0% | 2 |

I claim:

1. Fire retardant cellulosic containing material, which material contains an effective fire retardant amount of a reaction product obtained by reacting an aqueous solution of sulfamic acid containing from about 1 to about 40% by weight of sulfamic acid with an amount of an alkylene oxide which is from about 0.5 to about 1.5 times the weight of 100% sulfamic acid intimately associated therewith.

2. Fire retardant cellulosic materials as claimed in claim 1 wherein the material is paper.

3. Fire retardant cellulosic material as claimed in claim 1 wherein the material is cotton.

4. Fire retardant cellulosic materials as claimed in claim 1 wherein the alkylene oxide is ethylene oxide.

5. The fire retardant material of claim 1 wherein the aqueous sulfamic acid solution contains from about 7 to about 25% by weight sulfamic acid.

6. The fire retardant material of claim 1 wherein the reaction product of sulfamic acid and alkylene oxide has been obtained by reacting the alkylene oxide with a slurry of sulfamic acid and water, the sulfamic acid being from about 40 to about 90 percent by weight of the slurry.

7. Flame retardant cellulosic material as claimed in claim 1 wherein the reaction product has been neutralized with an alkaline reacting substance of the group consisting of ammonia and organic amines.

8. Fire retardant cellulose material as claimed in claim 4 wherein the alkylene oxide is ethylene oxide.

9. Fire retardant cellulosic material as claimed in claim 5 wherein said material is paper.

10. Fire retardant cellulosic materials as claimed in claim 1 wherein said material is cotton.

11. The fire retardant material of claim 7 wherein the aqueous reaction product is rendered neutral with ammonia.

12. The process of rendering cellulosic containing material fire retardant which comprises intimately associating with the material an effective fire retardant amount of the reaction product obtained by reacting an aqueous solution of sulfamic acid containing from about 1 to about 40% by weight of sulfamic acid with an amount of an alkylene oxide which is from about 0.5 to about 1.5 times the weight of 100% sulfamic acid intimately associated therewith.

13. The process of claim 12 in which the reaction product is prepared by bubbling the alkylene oxide into a solution of from about 1 to about 40% of sulfamic acid in water.

14. The process of claim 13 in which the temperature of the reaction is from about 0° to about 100° centigrade.

15. The process of claim 12 wherein the solution containing the reaction product of sulfamic acid and alkylene oxide is neutralized to a pH of from about 6 to about 8.0 with ammonia or other alkaline reacting substances.

16. The process of claim 12 wherein the alkylene oxide is ethylene oxide.

* * * * *